(12) United States Patent
Ponchon

(10) Patent No.: US 11,742,941 B2
(45) Date of Patent: *Aug. 29, 2023

(54) TUNABLE DENSE WAVELENGTH DIVISION MULTIPLEXING (DWDM) OPTICAL TIME-DOMAIN REFLECTOMETER (OTDR)-BASED OPTICAL FIBER MONITORING

(71) Applicant: VIAVI SOLUTIONS INC., San Jose, CA (US)

(72) Inventor: Jean Ponchon, Saint Medard en Forez (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,608

(22) Filed: Jan. 21, 2022

(65) Prior Publication Data

US 2022/0149935 A1 May 12, 2022

Related U.S. Application Data

(63) Continuation of application No. 17/093,273, filed on Nov. 9, 2020, now Pat. No. 11,271,642.

(30) Foreign Application Priority Data

Oct. 19, 2020 (EP) .................................. 20306240

(51) Int. Cl.
*H04B 10/07* (2013.01)
*H04B 10/071* (2013.01)
(Continued)

(52) U.S. Cl.
CPC ........ *H04B 10/071* (2013.01); *H04J 14/0227* (2013.01); *H04Q 11/0005* (2013.01)

(58) Field of Classification Search
CPC . H04B 10/071; H04B 10/079; H04J 14/0227; H04Q 11/0005

See application file for complete search history.

(56) References Cited

U.S. PATENT DOCUMENTS 10,809,480 B1 * 10/2020 Cox ...................... H04B 10/25
11,271,642 B1 * 3/2022 Ponchon ............ G01M 11/3136
(Continued)

FOREIGN PATENT DOCUMENTS

| EP | 3346620 A1 | 7/2018 |
|---|---|---|
| WO | 2011/057528 A1 | 5/2011 |

OTHER PUBLICATIONS

Thollabandi et al., "Tunable OTDR Based on Direct Modulation of Self-Injection-Locked RSOA for In-Service Monitoring of WDM-PON", IEEE Photonics Technology Letters, vol. 20, No. 15, Aug. 1, 2008, pp. 1323-1325.

(Continued)

*Primary Examiner* — Dzung D Tran
(74) *Attorney, Agent, or Firm* — Mannava & Kang, P.C.

(57) ABSTRACT

In some examples, a tunable dense wavelength division multiplexing (DWDM) optical time-domain reflectometer (OTDR) may include a fiber optic link analyzer, executed by at least one hardware processor, to determine, based on a user input, for a fiber optic link of a plurality of fiber optic finks of a fiber optic cable, whether the fiber optic fink is active or not active. The DWDM OTDR may specify, based on a determination that the fiber optic fink is active, a test wavelength that is different from a data transmission wavelength of data transmitted by the fiber optic fink. A DWDM multiplexer may be collocated with the DWDM OTDR to selectively connect, based on the specified test wavelength, the DWDM OTDR to the fiber optic fink of the plurality of fiber optic links for testing of the fiber optic link.

20 Claims, 13 Drawing Sheets

(51) Int. Cl.
 *H04J 14/02* (2006.01)
 *H04Q 11/00* (2006.01)

(56) References Cited

U.S. PATENT DOCUMENTS

| | | |
|---|---|---|
| 2006/0164628 A1 | 7/2006 | Kuo |
| 2015/0372752 A1* | 12/2015 | Liu .................... H04B 10/071 398/16 |
| 2018/0103303 A1* | 4/2018 | Schell ................. H04B 10/071 |
| 2020/0292416 A1 | 9/2020 | Gagnon et al. |
| 2021/0063273 A1 | 3/2021 | Lecoeuche |

OTHER PUBLICATIONS

Frigo et al., "Centralized In-Service OTDR Testing in a CWDM Business Access Network", Journal of Lightwave Technology, IEEE, vol. 22, No. 11, Nov. 1, 2004, pp. 2641-2652.

\* cited by examiner

1200

DETERMINE, BASED ON A USER INPUT, WHETHER A FIBER OPTIC LINK OF A PLURALITY OF FIBER OPTIC LINKS OF A FIBER OPTIC CABLE IS ACTIVE THAT REPRESENTS A CONDITION WHERE THE FIBER OPTIC LINK IS TRANSMITTING DATA OR NOT ACTIVE THAT REPRESENTS ANOTHER CONDITION WHERE THE FIBER OPTIC LINK IS NOT TRANSMITTING DATA
1202

SPECIFY, BASED ON A DETERMINATION THAT THE FIBER OPTIC LINK IS ACTIVE, A TEST WAVELENGTH THAT IS DIFFERENT FROM A DATA TRANSMISSION WAVELENGTH OF DATA TRANSMITTED BY THE FIBER OPTIC LINK
1204

SELECTIVELY CONNECT, BY A DWDM MULTIPLEXER COLLOCATED WITH THE DWDM OTDR, BASED ON THE SPECIFIED TEST WAVELENGTH, THE DWDM OTDR TO THE FIBER OPTIC LINK OF THE PLURALITY OF FIBER OPTIC LINKS FOR TESTING OF THE FIBER OPTIC LINK
1206

FIG. 12

TUNABLE DENSE WAVELENGTH DIVISION MULTIPLEXING (DWDM) OPTICAL TIME-DOMAIN REFLECTOMETER (OTDR)-BASED OPTICAL FIBER MONITORING

PRIORITY

This application is a Continuation Application of U.S. application Ser. No. 17/093,273, filed on Nov. 9, 2020, which claims priority under 35 U.S.C. 119(a)-(d) to European patent application number 20306240.1, having a filing date of Oct. 19, 2020, the disclosures of which are hereby incorporated by references in their entireties.

BACKGROUND

A fiber optic cable may include one or more optical fibers that may be used to transmit light from a source to a destination. Fiber optic cables may represent a network element of a fiber optic network. In this regard, other types of network elements may include optical connectors, optical splices, optical couplers, and optical switches. Performance of a fiber optic network may be tested by various types of devices.

BRIEF DESCRIPTION OF DRAWINGS

Features of the present disclosure are illustrated by way of example and not limited in the following figure(s), in which like numerals indicate like elements, in which:

FIG. 12 illustrates a flowchart of an example method for tunable DWDM OTDR-based optical fiber monitoring in accordance with an example of the present disclosure.

DETAILED DESCRIPTION

Figure 1:
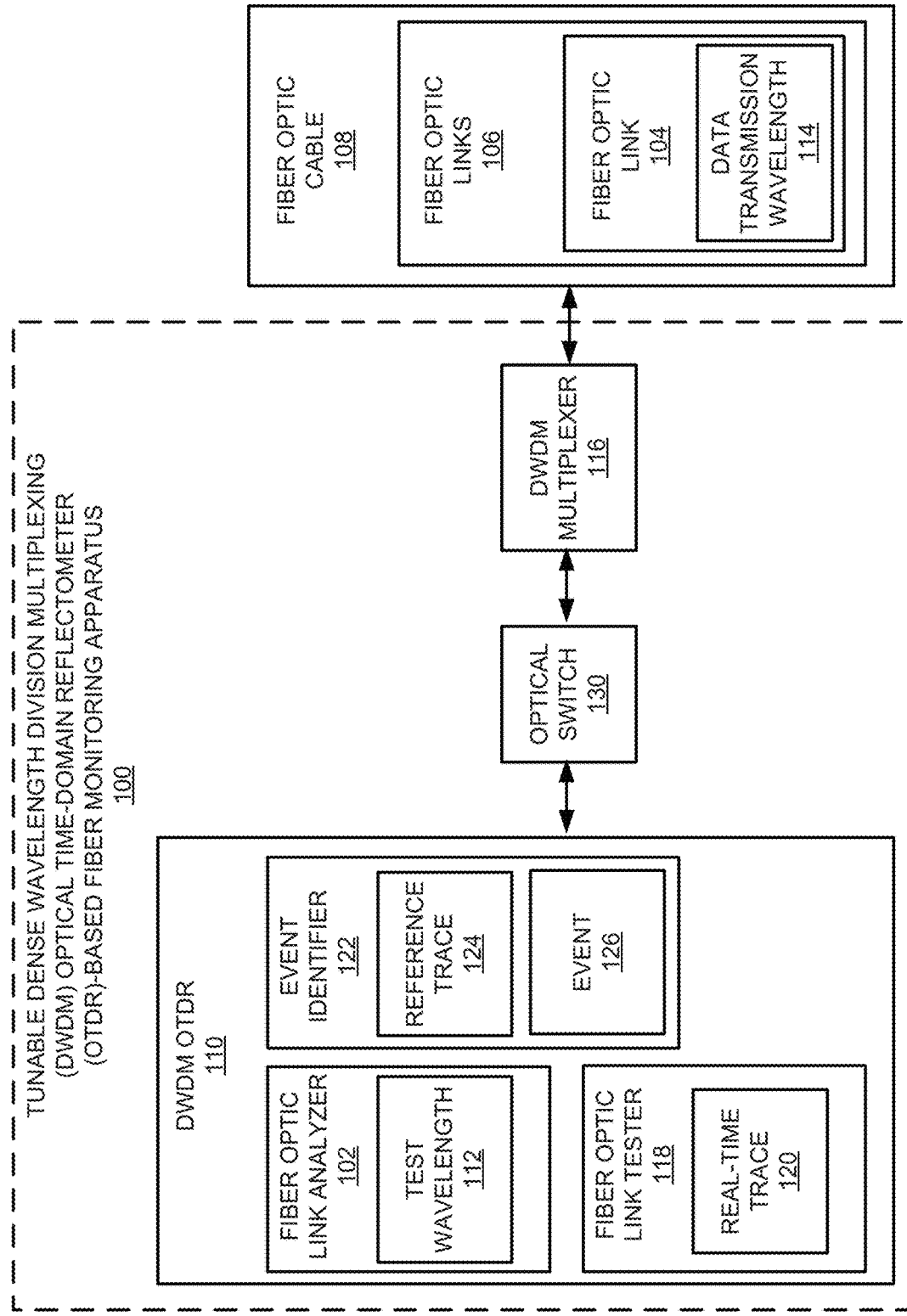
FIG. 1 illustrates an architectural layout of a tunable dense wavelength division multiplexing (DWDM) optical time-domain reflectometer (OTDR)-based optical fiber monitoring apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Tunable DWDM OTDR-based optical fiber monitoring apparatuses, methods for tunable DWDM OTDR-based optical fiber monitoring, and non-transitory computer readable media for tunable DWDM OTDR-based optical fiber monitoring are disclosed herein. The apparatuses, methods, and non-transitory computer readable media disclosed herein provide for optical fiber monitoring based on utilization of a DWDM multiplexer, which is a passive component that does not require power or data, to select, for a fiber optic cable that includes a plurality of fiber optic links, a fiber optic link that is to be monitored. For example, with respect to rack mounted fiber optic link monitoring, a common port of the DWDM multiplexer may be connected to a tunable DWDM OTDR. Other DWDM ports of the DWDM multiplexer may be connected to a fiber optic link or fiber optic links to be monitored. Each fiber optic link that is to be monitored may be associated to a wavelength of the tunable DWDM OTDR. The DWDM multiplexer may be implemented at a same location as the DWDM OTDR or at a remote location.

With respect to fiber optic link monitoring, an OTDR may represent an optoelectronic instrument used to characterize (or otherwise monitor) a fiber optic link. The OTDR may inject a series of optical pulses into a fiber optic link under test. Based on the injected optical pulses, the OTDR may extract, from the same end of the fiber optic link in which the optical pulses are injected, light that is scattered or reflected back from points along the fiber optic link. The scattered or reflected light that is gathered back may be used to characterize the fiber optic link. For example, the scattered or reflected light that is gathered back may be used to detect, locate, and measure events at any location of the fiber optic link. The events may include faults at any location of the fiber optic link. Other types of features that may be measured by the OTDR include attenuation uniformity and attenuation rate, segment length, and location and insertion loss of connectors and splices. An OTDR may include a laser source to generate a laser beam at a wavelength associated with the laser source. Alternatively, an OTDR may be tunable and include a laser source that is tunable to generate a plurality of wavelengths.

In some cases, an optical switch may be utilized to select, for monitoring, a particular fiber optic link of a plurality of fiber optic links of an optical fiber cable. The optical switch may include a specified operating temperature range. In this regard, the optical switch may need to be turned off when outside its operating temperature range. Thus, it is technically challenging to perform fiber optic link monitoring that is independent of an operating temperature range of an optical switch that is needed to select, for monitoring, a particular fiber optic link of a plurality of fiber optic links of an optical fiber cable.

In order to address at least the aforementioned technical challenges, for the apparatuses, methods, and non-transitory computer readable media disclosed herein, with respect to fiber monitoring with a portable unit, an optical switch may be replaced with a DWDM multiplexer to provide for testing of an optical fiber cable with a high fiber optic link count. With continuous wave light being available from a tunable DWDM OTDR source as disclosed herein, the optical return loss as well as the fiber optic link loss may be measured with one or more portable units including a tunable DWDM OTDR and a DWDM multiplexer.

Yet further, for the apparatuses, methods, and non-transitory computer readable media disclosed herein, with respect to a meshed network that includes a relatively short distance fiber optic link, a remote optical switch may be needed. The remote optical switch may need power and data communication that may be technically challenging to implement at a remote site. In this regard, for the apparatuses, methods, and non-transitory computer readable media disclosed herein, the remote optical switch may be replaced with a DWDM multiplexer as disclosed herein. The DWDM multiplexer may represent a passive device that does not require power as disclosed herein.

Operation principles associated with the apparatuses, methods, and non-transitory computer readable media are disclosed herein with respect to FIGS. 2-6.

Figure 2:
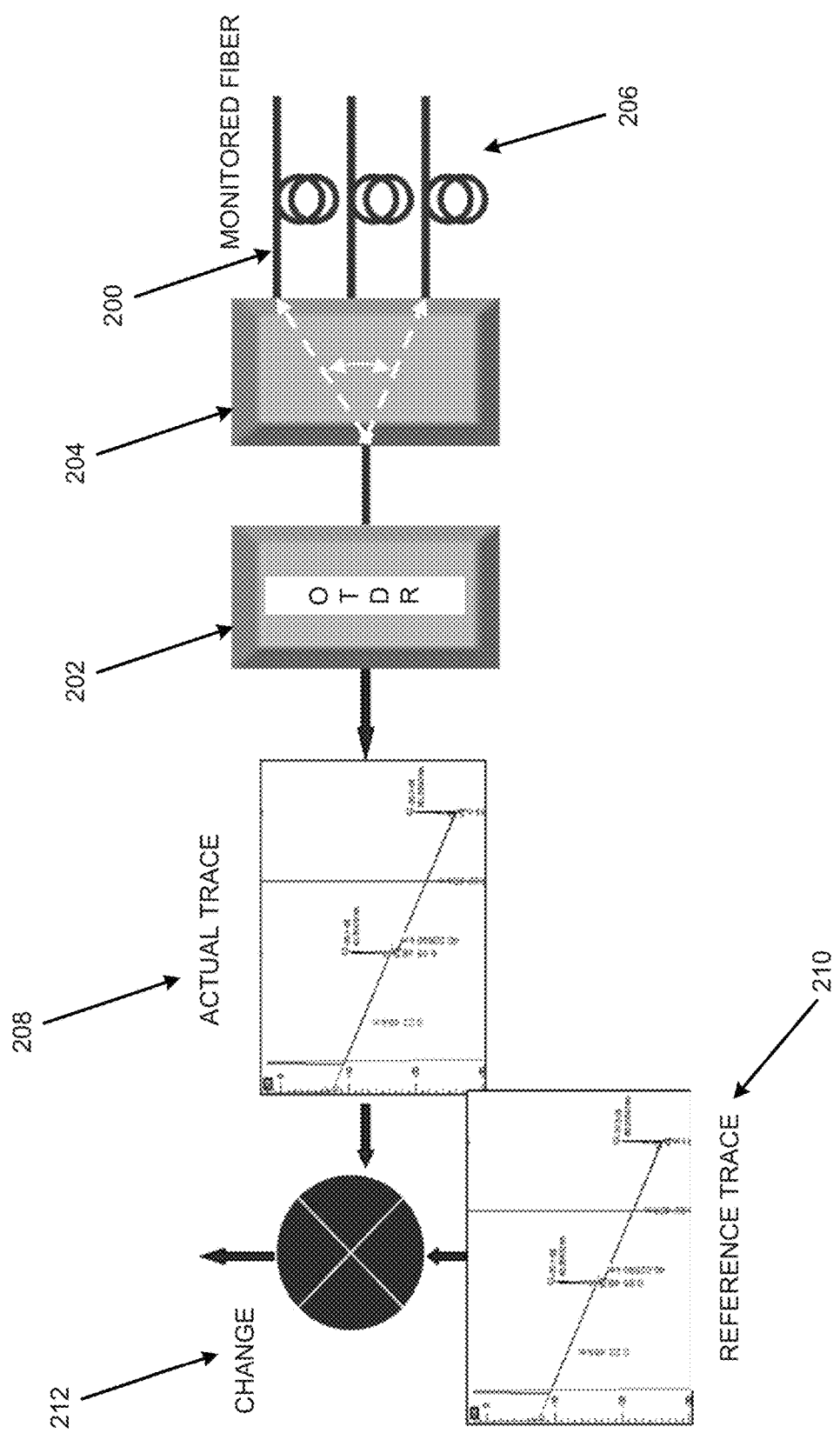
FIG. 2 illustrates monitoring of a fiber optic link, in accordance with an example of the present disclosure.

FIG. 2 illustrates monitoring of a fiber optic link, in accordance with an example of the present disclosure.

As shown in FIG. 2, in order to monitor a fiber optic link 200, an OTDR 202 may control an optical switch 204 to select the fiber optic link 200 from a plurality of fiber optic links 206. The OTDR 202 may acquire a trace 208 associated with the fiber optic link 200. The trace 208 may be compared to a reference trace 210 to detect an anomaly at 212.

Figure 3:
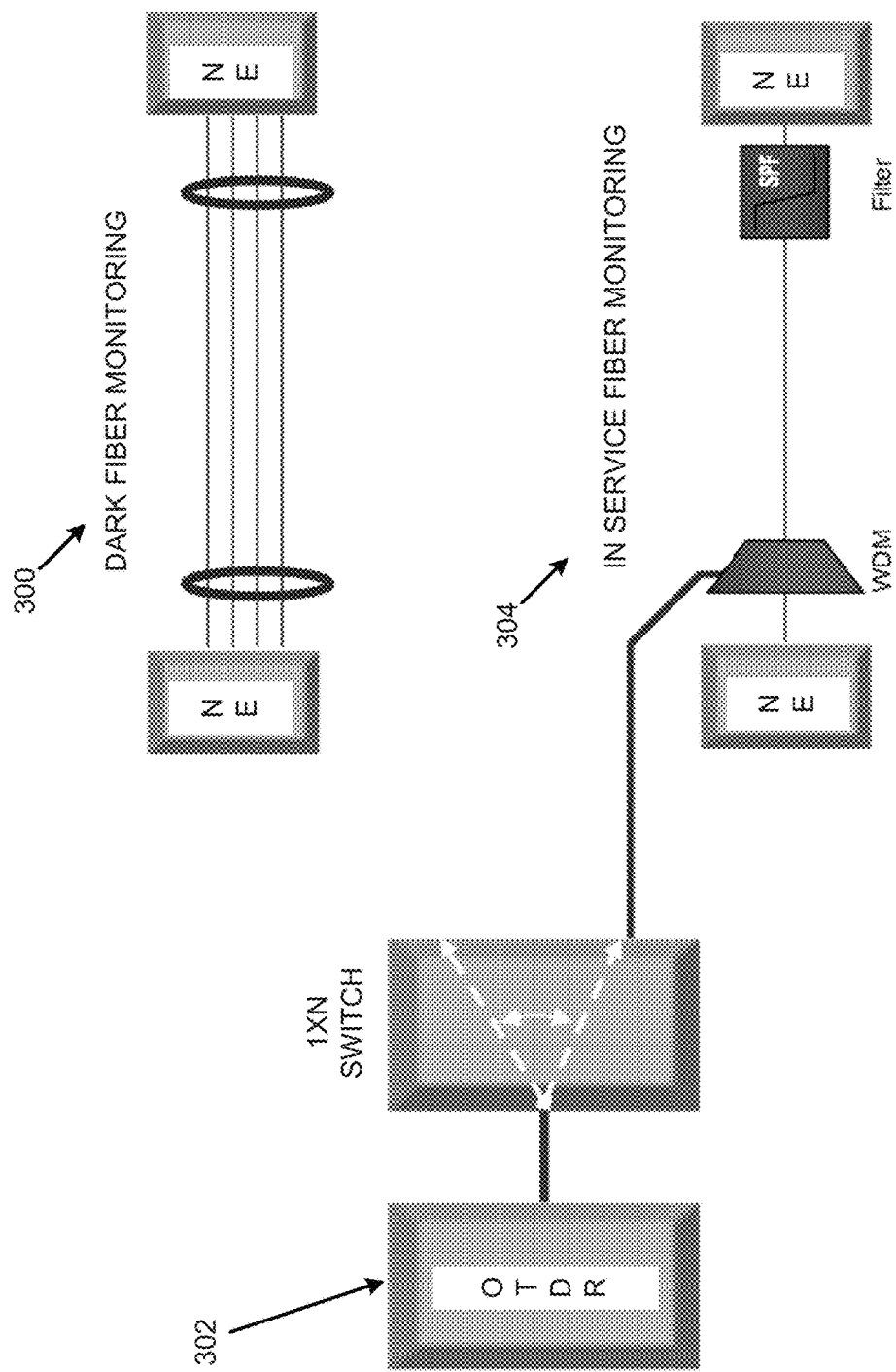
FIG. 3 illustrates dark versus in-service monitoring of a fiber optic link, in accordance with an example of the present disclosure.

FIG. 3 illustrates dark versus in-service monitoring of a fiber optic link, in accordance with an example of the present disclosure.

Referring to FIG. 3, a dark versus an in-service fiber optic link may respectively represent a fiber optic link that is without service versus a fiber optic link that includes data transmitted therein. In this regard, for a dark fiber optic link at 300, the OTDR 302 may utilize any wavelength for fiber optic link monitoring. Alternatively, for an in-service fiber optic link at 304, the OTDR 302 may utilize a wavelength that is different from data transmitted by fiber optic link. For example, the OTDR 302 may utilize a wavelength such as 1625 nm or 1650 nm for an in-service fiber optic link monitoring.

Figure 4:
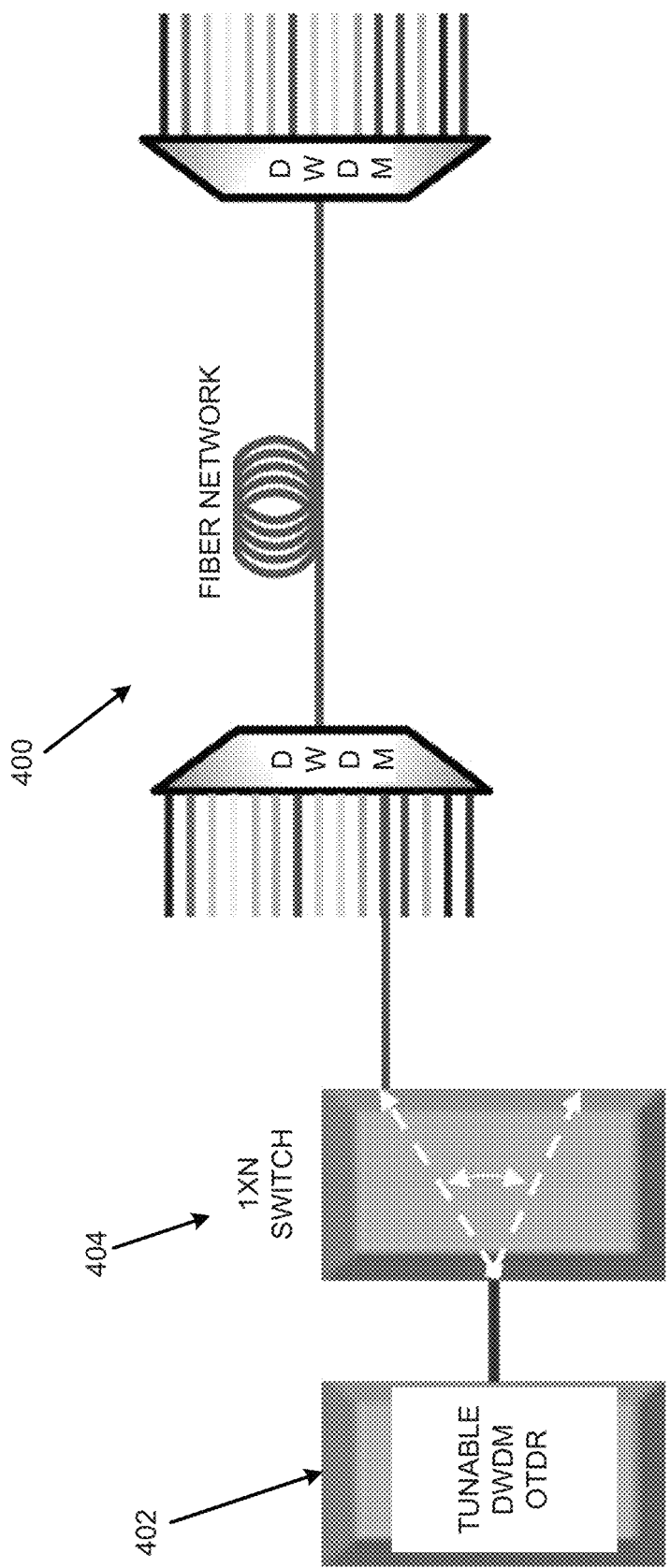
FIG. 4 illustrates in-service DWDM monitoring with a tunable DWDM OTDR, in accordance with an example of the present disclosure.

FIG. 4 illustrates in-service DWDM monitoring with a tunable DWDM OTDR, in accordance with an example of the present disclosure.

Referring to FIG. 4, in order to monitor DWDM or CWDM networks such as a network 400, a tunable DWDM OTDR 402 may be utilized. Thus, for the tunable DWDM OTDR 402, any DWDM channel may be used (e.g., not just a limited number of channels otherwise). One application may include testing of an active DWDM network such as the network 400 by using a channel that is not used by data (e.g., a free channel). The tunable DWDM OTDR 402 may insert a test reference in the fiber optic link that is to be tested. An optical switch 404 may include a step engine to select the fiber optic link that to be tested.

Figure 5:
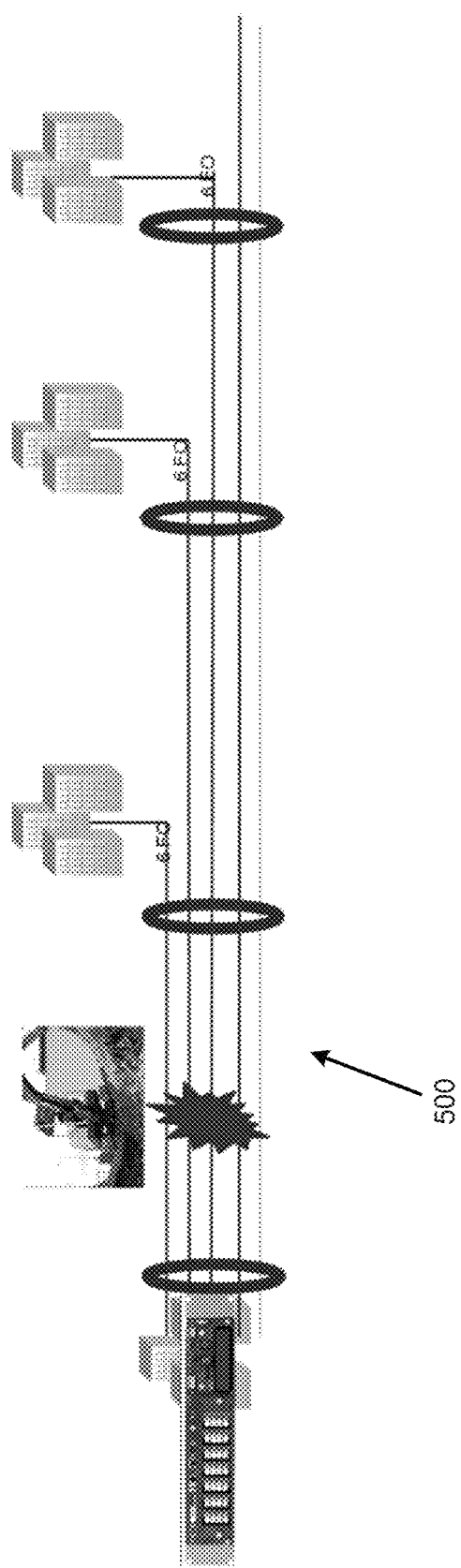
FIG. 5 illustrates implementation of a monitoring strategy, in accordance with an example of the present disclosure.

FIG. 5 illustrates implementation of a monitoring strategy, in accordance with an example of the present disclosure.

Referring to FIG. 5, a fiber optic cable such as the cable 500 may include a plurality of fiber optic links. In this regard, if one of the fiber optic links is damaged, all of the fiber optic links of the fiber optic cable ray be affected by the damaged fiber optic link. Thus, not all fiber optic links may need to be individually monitored to monitor a status of the fiber optic cable.

Figure 6:
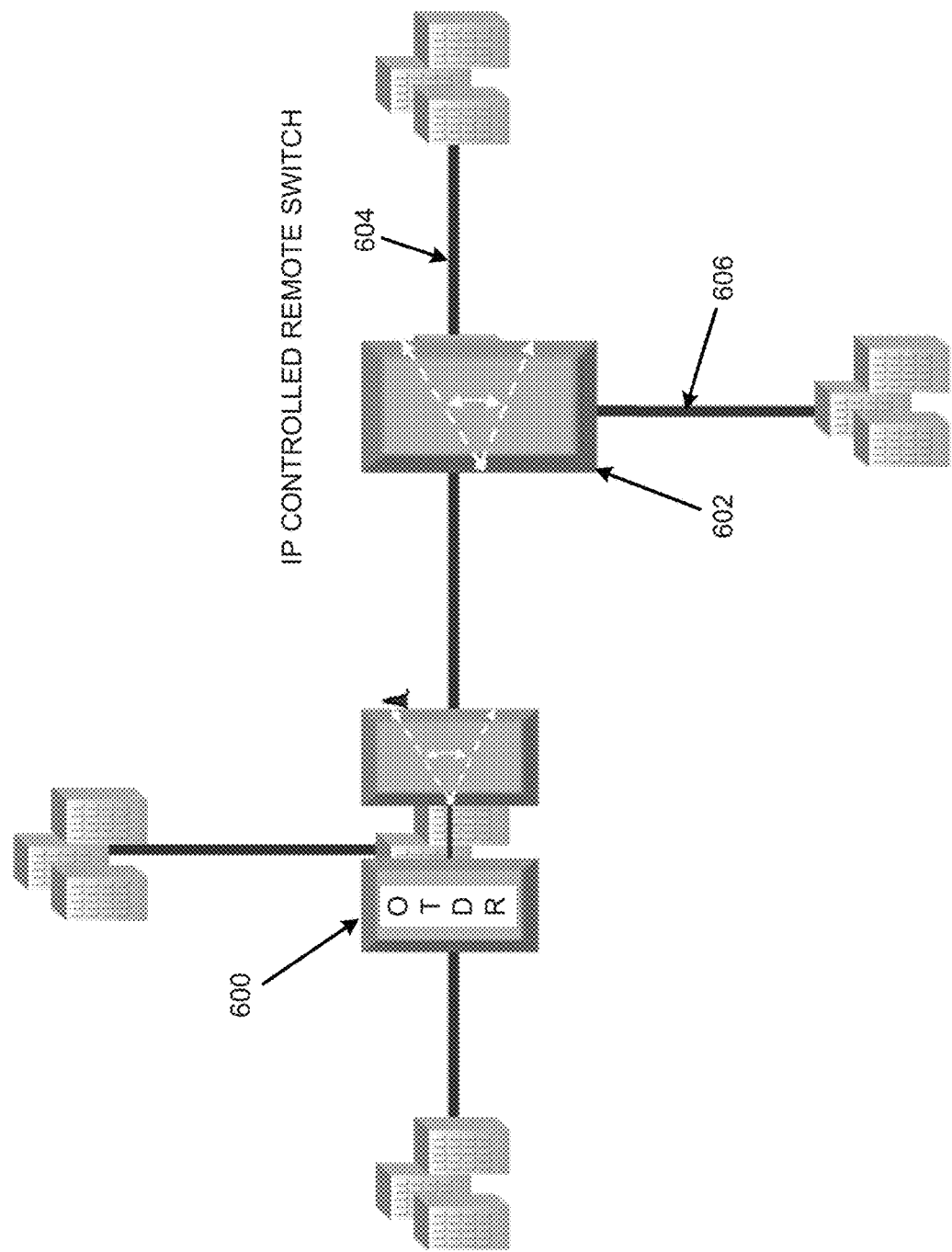
FIG. 6 illustrates optical test unit implementation, in accordance with an example of the present disclosure.

FIG. 6 illustrates optical test unit implementation, in accordance with an example of the present disclosure.

Referring to FIG. 6, with respect to short access distance (e.g., a metro network or access network), when an OTDR 600 has sufficient dynamic range to cover ore than one section of a network, an optical switch 602, which is not collocated to the OTDR 600, may be used at a remote location to select a branch (e.g., branch 604 or 606) of the network. In this manner, the OTDR 600 may monitor a specific branch of the network as needed.

With continued reference to FIG. 6, the remote optical switch 602 may need power and data communication that may be technically challenging to implement at a remote site. In this regard, as disclosed herein with reference to FIGS. 1 and 7-10, an optical switch, such as the remote optical switch 602 (or the optical switch 404 of FIG. 4), may be replaced with a DWDM multiplexer. The DWDM multiplexer may represent a passive device that does not require power as disclosed herein.

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of a tunable DWDM OTDR-based optical fiber monitoring apparatus (hereinafter also referred to as "apparatus 100") in accordance with an example of the present disclosure.

Referring to FIG. 1, the apparatus 100 may include a fiber optic link analyzer 102 that is executed by at least one hardware processor (e.g., the hardware processor 1102 of FIG. 11, and/or the hardware processor 1304 of FIG. 13), to determine, based on a user input or another type of indication (e.g., a measurement etc.), for a fiber optic link 104 of a plurality of fiber optic links 106 of a fiber optic cable 108, whether the fiber optic link 104 is active that represents a condition where the fiber optic link 104 is transmitting data or not active that represents another condition where the fiber optic link 104 is not transmitting data. The fiber optic link analyzer 102 may be a component of a tunable DWDM OTDR 110.

The fiber optic link analyzer 102 may specify, based on a determination that the fiber optic link 104 is active, a test wavelength 112 that is different from a data transmission wavelength 114 of data transmitted by the fiber optic link 104.

A DWDM multiplexer 116 may be collocated with the DWDM OTDR 110. The DWDM multiplexer 116 may selectively connect, based on the specified test wavelength 112, the DWDM OTDR 110 to the fiber optic link 104 of the plurality of fiber optic links 106 for testing of the fiber optic link 104.

According to examples disclosed herein, the tunable DWDM OTDR 110 may further include a fiber optic link tester 118 that is executed by at least one hardware processor (e.g., the hardware processor 1102 of FIG. 11, and/or the hardware processor 1304 of FIG. 13) to generate, based on a test laser beam injected into the fiber optic link 104 selectively connected to by the DWDM multiplexer 116, a real-time trace 120 associated with the fiber optic link 104.

According to examples disclosed herein, the tunable DWDM OTDR 110 may further include an event identifier 122 that is executed by at least one hardware processor (e.g., the hardware processor 1102 of FIG. 11, and/or the hardware processor 1304 of FIG. 13) to identify, based on comparison of the real-time trace 120 to a reference trace 124 associated with the fiber optic link 104, an event 126 associated with the fiber optic link 104.

According to examples disclosed herein, a wavelength division multiplexer (e.g., see FIG. 8) may be collocated with the DWDM OTDR 110 and, in some cases, with the DWDM multiplexer 116, and operatively disposed between the DWDM OTDR 110 and the DWDM multiplexer 116. In some examples, the wavelength division multiplexer may be utilized with an active fiber optic link 104 so that a test wavelength transmitted by the DWDM OTDR 110 is different from a data transmission wavelength 114 of data transmitted by the fiber optic link 104. In other examples, the wavelength division multiplexer (e.g., see FIG. 10) may be operatively disposed between the DWDM multiplexer 116 and a fiber optic link that is being tested.

According to examples disclosed herein, the fiber optic link analyzer 102 may specify, based on a determination that the fiber optic link 104 is not active, the test wavelength 112 from a plurality of wavelengths that can be generated by the tunable DWDM OTDR (e.g., 1550 nm, 1625 nm, or 1650 nm, or any other wavelength that may be implemented by the tunable DWDM OTDR 110).

According to examples disclosed herein, an optical switch 130 may be collocated with the DWDM OTDR 110 and the DWDM multiplexer 116. The optical switch 130 may be operatively disposed between the DWDM OTDR 110 and the DWDM multiplexer 116. In this regard, the optical switch 130 may provide for selection of a channel corresponding to a network of a plurality of networks to test the fiber optic link 104 included in the network from fiber optic links included in other networks of the plurality of networks that are operatively connected to the DWDM OTDR 110 for testing by the DWDM OTDR 110.

Operation of the apparatus 100 is described in further detail with reference to FIGS. 7-10.

Figure 7:
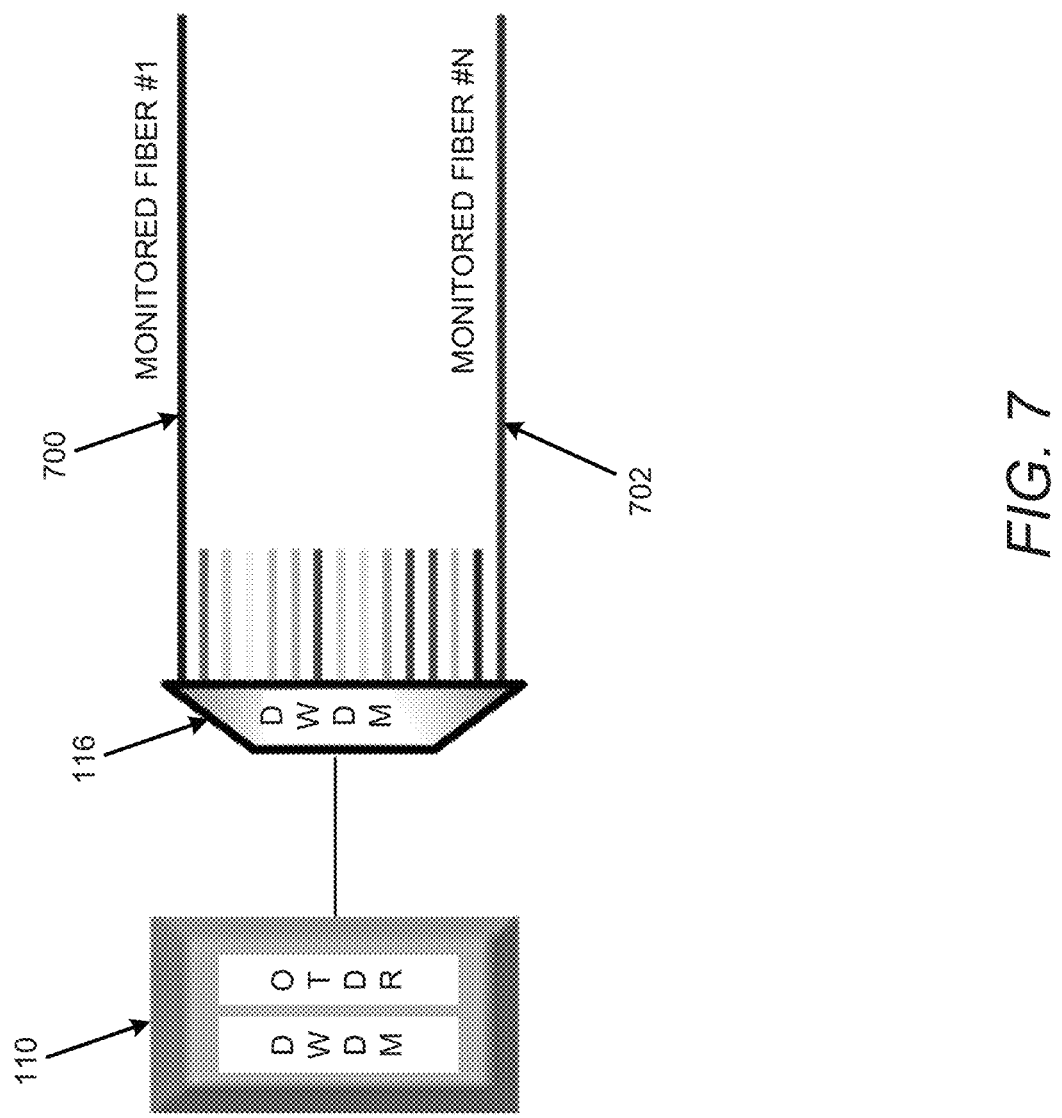
FIG. 7 illustrates optical fiber monitoring with a tunable DWDM OTDR, in accordance with an example of the present disclosure.

FIG. 7 illustrates optical fiber monitoring with a tunable DWDM OTDR, in accordance with an example of the present disclosure.

Referring to FIGS. 1 and 7, an example of a DWDM OTDR 110 and a DWDM multiplexer 116 is shown. The DWDM multiplexer 116 may be collocated with the DWDM OTDR 110. The DWDM multiplexer 116 may selectively connect, based on a specified test wavelength 112, the DWDM OTDR 110 to a fiber optic link 104 of a plurality of fiber optic links 106 for testing of the fiber optic link 104. For example, the DWDM multiplexer 116 may selectively connect the DWDM OTDR 110 to fiber optic link #1 at 700 or fiber optic link #n at 702. The DWDM OTDR 110 may be used to select fiber optic link #1 at 700 or fiber optic link #n at 702 (e.g., corresponding to channels of the DWDM multiplexer 116) by selecting corresponding reference channels of the DWDM OTDR 110.

Figure 8:
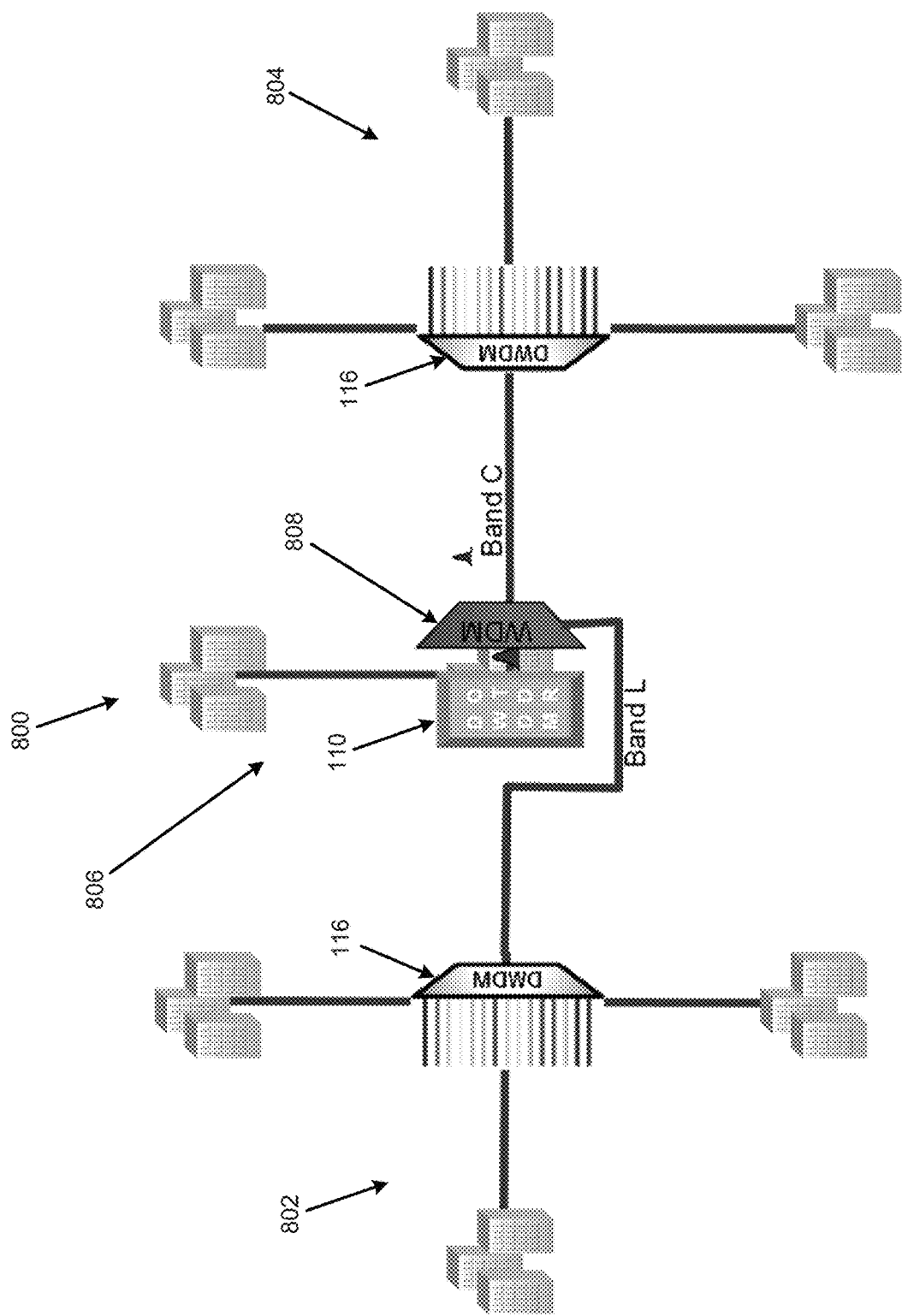
FIG. 8 illustrates application for a metro access network with short distance, in accordance with an example of the present disclosure.
Figure 9:
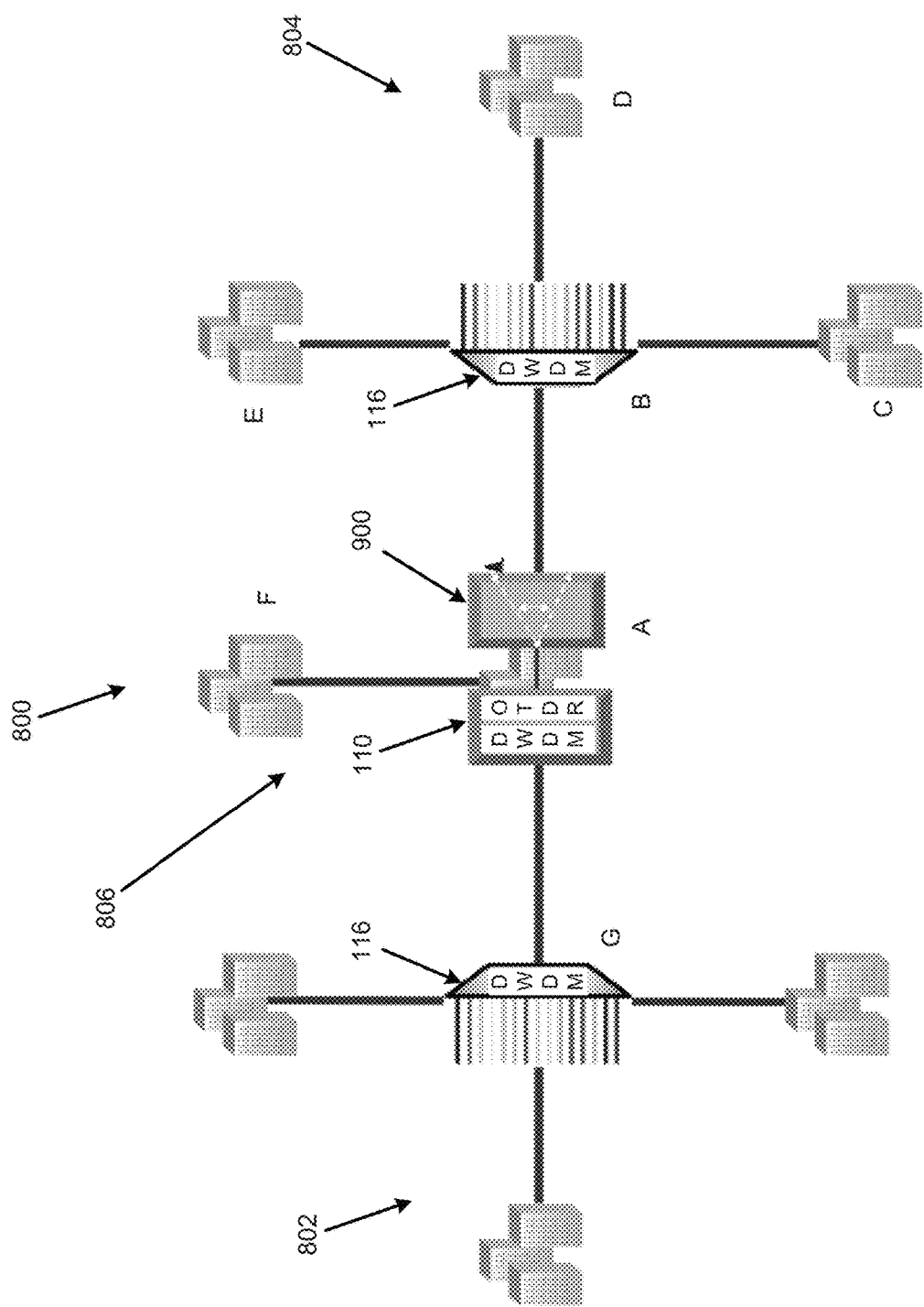
FIG. 9 illustrates another application for a metro network with short distance, in accordance with an example of the present disclosure.

FIG. 8 illustrates application for a metro access network with short distance, in accordance with an example of the present disclosure. FIG. 9 illustrates another application for a metro network with short distance, in accordance with an example of the present disclosure.

Referring to FIGS. 8 and 9, for a network 800 (e.g., a metro access network) that may include relatively short sections, the DWDM OTDR 110 may be utilized to monitor more than one section of the network 800. For example, the DWDM OTDR 110 may be utilized to monitor sections 802, 804, and section 806. In this regard, as shown in FIG. 8, the DWDM OTDR 110 may utilize a wavelength division multiplexer 808 and band-L to monitor section 802, and a band-C to monitor section 804. Alternatively, as shown in FIG. 9, an optical switch 900 may be disposed adjacent the DWDM OTDR 110 to select section 802, 804, or 806.

For example, referring to FIG. 9, with respect to optical switch 900, the various elements of the network 800 are denoted with labels "F", "G", etc. In this regard, in order to monitor the network section between locations A, B, and C, the optical switch 900 may be used to select section A-B, and DWDM OTDR 110 may utilize a reference signal that propagates into the fiber optic link from location B to location C. In a similar manner, in order to monitor the network section between locations A, B, and D, the optical switch 900 may be used to select section A-B, and DWDM OTDR 110 may utilize a reference signal that propagates into the fiber optic link from location B to location D. Thus, the optical switch 900 may be used to select various sections of the network 800 (e.g., from A to B, from A to F, or from A to G).

Figure 10:
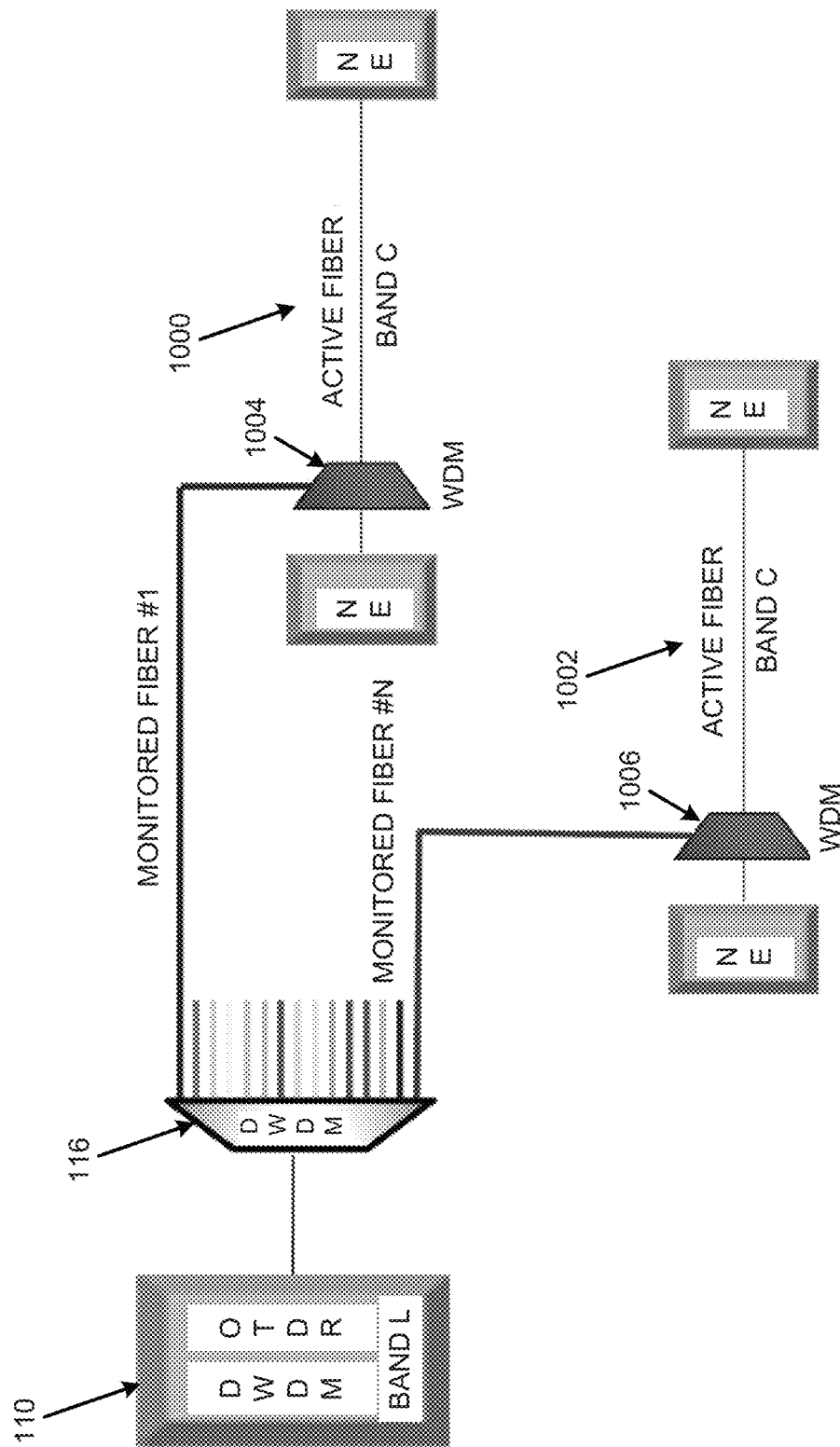
FIG. 10 illustrates an example of active optical fiber monitoring, in accordance with an example of the present disclosure.

FIG. 10 illustrates an example of active optical fiber monitoring, accordance with an example of the present disclosure Referring to FIG. 10, the DWDM OTDR 110 and the DWDM multiplexer 116 may be utilized with dark or in-service fiber optic links. For example, for in-service (e.g., active) fiber optic links 1000 and 1002, the DWDM OTDR 110 may select, via the DWDM multiplexer 116, either fiber optic link 1000 or fiber optic link 1002 for monitoring. For example, assuming that the data transmitted by fiber optic link 1000 utilizes band-C, the DWDM OTDR 110 may utilize a wavelength in band-L to test the fiber optic link 1000 via a wavelength division multiplexer 1004. Similarly, assuming that the data transmitted by fiber optic link 1002 utilizes band-C, the DWDM OTDR 110 may utilize another wavelength in band-L to test the fiber optic link 1002 via a wavelength division multiplexer 1006. In this regard, compared to the configuration of FIG. 9 in which the DWDM multiplexer 116 at location "B" is not collocated with the DWDM OTDR 110 (e.g., optical switch 900 disposed therebetween), for FIG. 10, the DWDM multiplexer 116 may be collocated with the DWDM OTDR 110.

Figure 11:
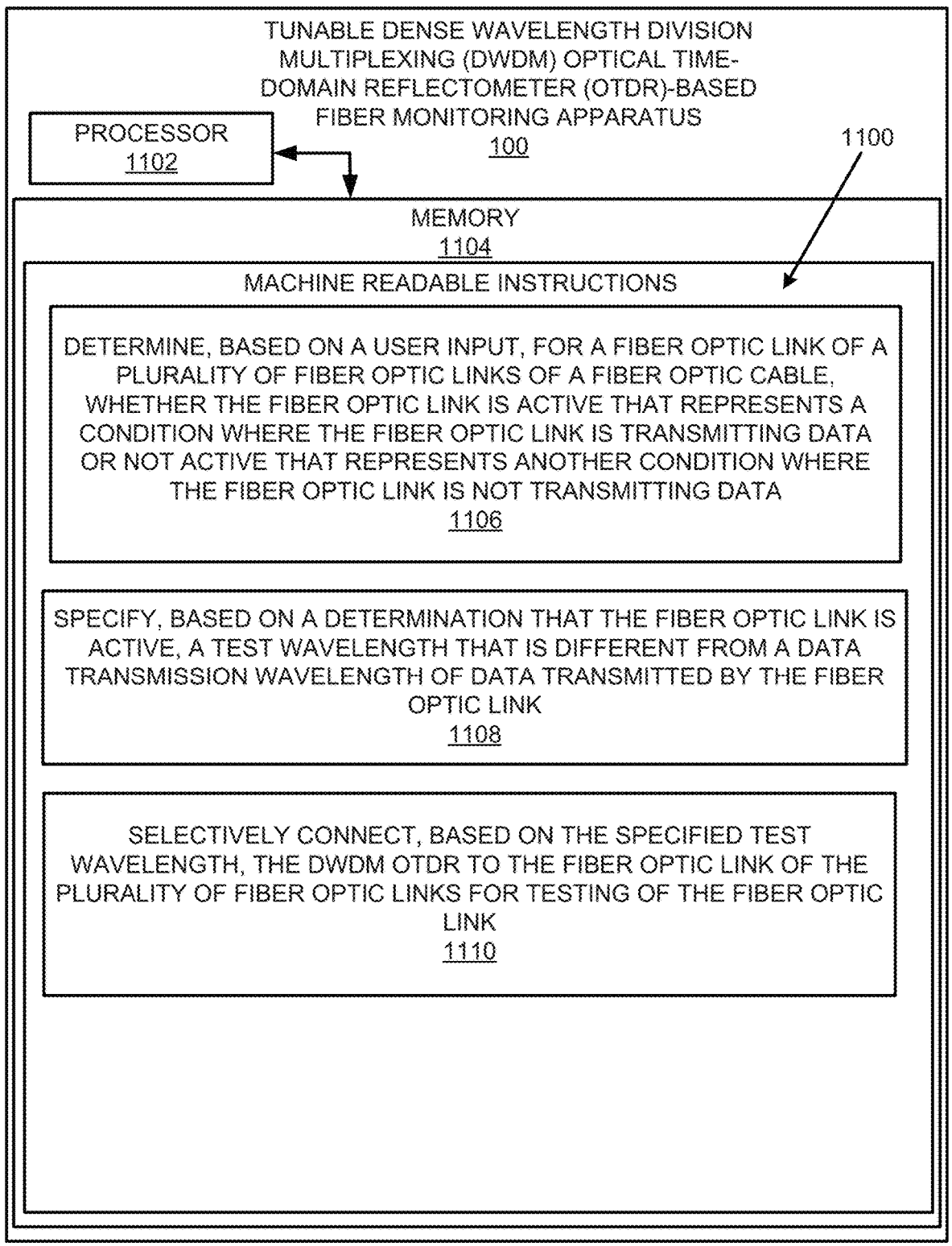
FIG. 11 illustrates an example block diagram for tunable DWDM OTDR-based optical fiber monitoring in accordance with an example of the present disclosure.
Figure 13:
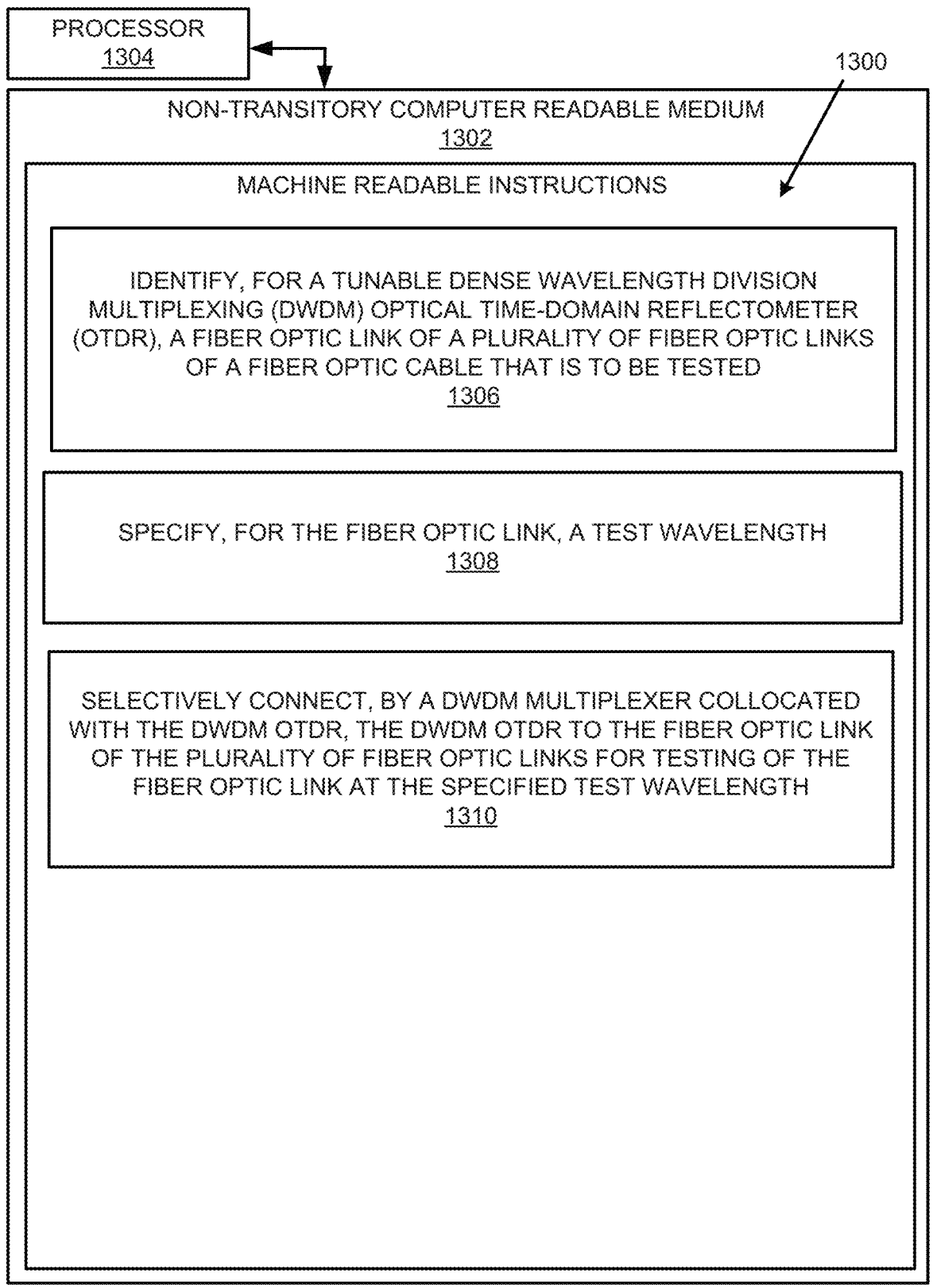
FIG. 13 illustrates a further example block diagram for tunable DWDM OTDR-based optical fiber monitoring in accordance with another example of the present disclosure.

FIGS. 11-13 respectively illustrate an example block diagram 1100, a flowchart of an example method 1200, and a further example block diagram 1300 for tunable DWDM OTDR-based optical fiber monitoring, according to examples. The block diagram 1100, the method 1200, and the block diagram 1300 may be implemented on the apparatus 100 described above with reference to FIG. 1 by way of example and not of limitation. The block diagram 1100, the method 1200, and the block diagram 1300 may be practiced in other apparatuses. In addition to showing the block diagram 1100, FIG. 11 shows hardware of the apparatus 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent an example method for tunable DWDM OTDR-based optical fiber monitoring, and the steps of the method. FIG. 13 may represent a non-transitory computer readable medium 1302 having stored thereon machine readable instructions to provide tunable DWDM OTDR-based optical fiber monitoring according to an example. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to determine, based on a user input, for a fiber optic link 104 of a plurality of fiber optic links 106 of a fiber optic cable 108, whether the fiber optic link 104 is active that represents a condition where the fiber optic link is transmitting data or not active that represents another condition where the fiber optic link is not transmitting data.

The processor 1102 may fetch, decode, and execute the instructions 1108 to specify, based on a determination that the fiber optic link 104 is active, a test wavelength 112 that is different from a data transmission wavelength 114 of data transmitted by the fiber optic link 104.

The processor 1102 may fetch, decode, and execute the instructions 1110 to selectively connect, based on the specified test wavelength, the DWDM OTDR 110 to the fiber optic link 104 of the plurality of fiber optic links 106 for testing of the fiber optic link 104.

Referring to FIGS. 1-10 and 12, and particularly FIG. 12, for the method 1200, at block 1202, the method may include determining, based on a user input, by at least one hardware processor of a tunable DWDM OTDR 110, whether a fiber optic link 104 of a plurality of fiber optic links 106 of a fiber optic cable 108 is active that represents a condition where the fiber optic link is transmitting data or not active that represents another condition where the fiber optic link is not transmitting data.

At block 1204, the method may include specifying, by the at least one hardware processor, based on a determination that the fiber optic link 104 is active, a test wavelength 112 that is different from a data transmission wavelength 114 of data transmitted by the fiber optic link 104.

At block 1206, the method may include selectively connecting, by a DWDM multiplexer 116 collocated with the DWDM OTDR 110, based on the specified test wavelength, the DWDM OTDR 110 to the fiber optic link 104 of the plurality of fiber optic links 106 for testing of the fiber optic link 104.

Referring to FIGS. 1-10 and 13, and particularly FIG. 13, for the block diagram 1300, the non-transitory computer readable medium 1302 may include instructions 1306 to identify, for a tunable DWDM OTDR, a fiber optic link 104 of a plurality of fiber optic links 106 of a fiber optic cable 108 that is to be tested.

The processor 1304 may fetch, decode, and execute the instructions 1308 to specify, for the fiber optic link 104, a test wavelength 112.

The processor 1304 may fetch, decode, and execute the instructions 1310 to selectively connect, by a DWDM multiplexer 116 collocated with the DWDM OTDR 110, the DWDM OTDR 110 to the fiber optic link 104 of the plurality of fiber optic links 106 for testing of the fiber optic link 104 at the specified test wavelength.

According to examples disclosed herein, the processor 1304 may fetch, decode, and execute the instructions to generate, based on a test laser beam injected into the fiber optic link 104 selectively connected to by the DWDM multiplexer 116, a real-time trace 120 associated with the fiber optic link 104.

According to examples disclosed herein, the processor 1304 may fetch, decode, and execute the instructions to identify, based on comparison of the reap time trace 120 to a reference trace 124 associated with the fiber optic link 104, an event associated with the fiber optic link 104.

According to examples disclosed herein, the processor 1304 may fetch, decode, and execute the instructions to determine, based on a user input, whether the fiber optic link 104 is active that represents a condition where the fiber optic link 104 is transmitting data or not active that represents another condition where the fiber optic link 104 is not transmitting data.

According to examples disclosed herein, the processor 1304 may fetch, decode, and execute the instructions to specify, based on a determination that the fiber optic link 104 is active, the test wavelength that is different from a data transmission wavelength of data transmitted by the fiber optic link 104.

According to examples disclosed herein, the processor 1304 may fetch, decode, and execute the instructions to specify, based on a determination that the fiber optic link 104 is not active, the test wavelength from a plurality of wavelengths that can be generated by the tunable DWDM OTDR 110.

According to examples disclosed herein, the processor 1304 may fetch, decode, and execute the instructions to control an optical switch 130 collocated with the DWDM OTDR 110 and the DWDM multiplexer 116 and disposed between the DWDM OTDR 110 and the DWDM multiplexer 116 to select a channel corresponding to a network of a plurality of networks to test the fiber optic link 104 included in the network from fiber optic links included in other networks of the plurality of networks that are operatively connected to the DWDM OTDR 110 for testing by the DWDM OTDR 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a tunable optical time-domain reflectometer (OTDR) comprising a fiber optic link analyzer, executed by at least one hardware processor, to:
determine, based on a user input, for a fiber optic link of a plurality of fiber optic links of a fiber optic cable, whether the fiber optic link is active that represents a condition where the fiber optic link is transmitting data or not active that represents another condition where the fiber optic link is not transmitting data; and
specify, based on a determination that the fiber optic link is active, a test wavelength that is different from a data transmission wavelength of data transmitted by the fiber optic link; and
a dense wavelength division multiplexing (DWDM) multiplexer, collocated with the OTDR to selectively connect, based on the specified test wavelength, the OTDR to the fiber optic link of the plurality of fiber optic links for testing of the fiber optic link.

2. The apparatus according to claim 1, wherein the tunable OTDR further comprises a fiber optic link tester, executed by the at least one hardware processor, to:
generate, based on a test laser beam injected into the fiber optic link selectively connected by the DWDM multiplexer, a real-time trace associated with the fiber optic link.

3. The apparatus according to claim 2, wherein the tunable OTDR further comprises an event identifier, executed by the at least one hardware processor, to
identify, based on comparison of the real-time trace to a reference trace associated with the fiber optic link, an event associated with the fiber optic link.

4. The apparatus according to claim 1, further comprising:
a wavelength division multiplexer collocated with the OTDR, and operatively disposed between the OTDR and the DWDM multiplexer.

5. The apparatus according to claim 1, wherein the fiber optic link analyzer is executed by the at least one hardware processor to:
specify, based on a determination that the fiber optic link is not active, the test wavelength from a plurality of wavelengths that can be generated by the tunable OTDR.

6. The apparatus according to claim 1, further comprising:
an optical switch collocated with the OTDR and the DWDM multiplexer, and operatively disposed between the OTDR and the DWDM multiplexer.

7. A method comprising:
determining, based on a user input, by at least one hardware processor of a tunable optical time-domain reflectometer (OTDR), whether a fiber optic link of a plurality of fiber optic links of a fiber optic cable is active that represents a condition where the fiber optic link is transmitting data or not active that represents another condition where the fiber optic link is not transmitting data;
specifying, by the at least one hardware processor, based on a determination that the fiber optic link is active, a test wavelength that is different from a data transmission wavelength of data transmitted by the fiber optic link; and
selectively connecting, by a dense wavelength division multiplexing (DWDM) multiplexer collocated with the OTDR, based on the specified test wavelength, the OTDR to the fiber optic link of the plurality of fiber optic links for testing of the fiber optic link.

8. The method according to claim 7, further comprising:
generating, by the at least one hardware processor, based on a test laser beam injected into the fiber optic link selectively connected by the DWDM multiplexer, a real-time trace associated with the fiber optic link.

9. The method according to claim 8, further comprising:
identifying, by the at least one hardware processor, based on comparison of the real-time trace to a reference trace associated with the fiber optic link, an event associated with the fiber optic link.

10. The method according to claim 7, further comprising:
implementing, between the OTDR and the DWDM multiplexer, a wavelength division multiplexer collocated with the OTDR.

11. The method according to claim 7, further comprising:
specifying, by the at least one hardware processor, based on a determination that the fiber optic link is not active, the test wavelength from a plurality of wavelengths that can be generated by the tunable OTDR.

12. The method according to claim 7, further comprising:
implementing, between the OTDR and the DWDM multiplexer, an optical switch collocated with the OTDR and the DWDM multiplexer.

13. The method according to claim 12, further comprising:
testing a remote fiber optic network that includes the DWDM multiplexer disposed at a remote location compared to the optical switch and the OTDR.

14. A non-transitory computer readable medium having stored thereon machine readable instructions, the machine readable instructions, when executed by at least one hardware processor, cause the at least one hardware processor to:
identify, for a tunable optical time-domain reflectometer (OTDR), a fiber optic link of a plurality of fiber optic links of a fiber optic cable that is to be tested;
specify, for the fiber optic link, a test wavelength; and
selectively connect, by a dense wavelength division multiplexing (DWDM) multiplexer collocated with the OTDR, the OTDR to the fiber optic link of the plurality of fiber optic links for testing of the fiber optic link at the specified test wavelength.

15. The non-transitory computer readable medium according to claim 14, wherein the machine readable instructions, when executed by the at least one hardware processor, further cause the at least one hardware processor to:
generate, based on a test laser beam injected into the fiber optic link selectively connected by the DWDM multiplexer, a real-time trace associated with the fiber optic link.

16. The non-transitory computer readable medium according to claim 15, wherein the machine readable instructions, when executed by the at least one hardware processor, further cause the at least one hardware processor to:

identify, based on comparison of the real-time trace to a reference trace associated with the fiber optic link, an event associated with the fiber optic link.

17. The non-transitory computer readable medium according to claim 14, wherein the machine readable instructions, when executed by the at least one hardware processor, further cause the at least one hardware processor to:

determine, based on a user input, whether the fiber optic link is active that represents a condition where the fiber optic link is transmitting data or not active that represents another condition where the fiber optic link is not transmitting data.

18. The non-transitory computer readable medium according to claim 17, wherein the machine readable instructions, when executed by the at least one hardware processor, further cause the at least one hardware processor to:

specify, based on a determination that the fiber optic link is active, the test wavelength that is different from a data transmission wavelength of data transmitted by the fiber optic link.

19. The non-transitory computer readable medium according to claim 17, wherein the machine readable instructions, when executed by the at least one hardware processor, further cause the at least one hardware processor to:

specify, based on a determination that the fiber optic link is not active, the test wavelength from a plurality of wavelengths that can be generated by the tunable OTDR.

20. The non-transitory computer readable medium according to claim 14, wherein the machine readable instructions, when executed by the at least one hardware processor, further cause the at least one hardware processor to:

control an optical switch collocated with the OTDR and the DWDM multiplexer and disposed between the OTDR and the DWDM multiplexer to select a channel corresponding to a network of a plurality of networks to test the fiber optic link included in the network from fiber optic links included in other networks of the plurality of networks that are operatively connected to the OTDR for testing by the OTDR.

\* \* \* \* \*